US008582736B2

(12) United States Patent
Isozaki (10) Patent No.: US 8,582,736 B2
(45) Date of Patent: Nov. 12, 2013

(54) COMMUNICATION DEVICE AND COMMUNICATION SYSTEM (75) Inventor: Atsushi Isozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 637 days.

(21) Appl. No.: 12/846,781

(22) Filed: Jul. 29, 2010

(65) Prior Publication Data

US 2011/0026695 A1    Feb. 3, 2011

(30) Foreign Application Priority Data

Jul. 31, 2009    (JP) .................... 2009-178695

(51) Int. Cl.
*H04M 11/00*    (2006.01)

(52) U.S. Cl.
USPC .................. 379/100.01; 379/93.01

(58) Field of Classification Search
USPC ............. 379/100.01; 358/1.15; 455/557
See application file for complete search history.

(56) References Cited

U.S. PATENT DOCUMENTS

| 2007/0291301 | A1* | 12/2007 | Ozawa et al. | 358/1.15 |
| 2008/0013123 | A1* | 1/2008 | Yoshioka | 358/1.15 |
| 2008/0058012 | A1* | 3/2008 | Ookuma | 455/557 |

FOREIGN PATENT DOCUMENTS

| JP | H08-279865 A | 10/1996 |
| JP | H11-191821 A | 7/1997 |
| JP | 2006-025216 A | 1/2006 |

OTHER PUBLICATIONS

Japan Patent Office, Notice of Reasons for Rejection for Japanese Patent Application No. 2009-178695 (counterpart to above-captioned patent application), mailed May 10, 2011.

* cited by examiner

*Primary Examiner* — Mohammad Islam
*Assistant Examiner* — Van D Huynh
(74) *Attorney, Agent, or Firm* — Baker Botts L.L.P.

(57) ABSTRACT

A communication system includes a data processing device that communicates with a communication device via a first transmission link. The communication device includes a first communication controller that controls communication with the data processing device via the first transmission link, and a second communication controller that controls communication via a second transmission link which is different from the first transmission link. The communication device also includes a transmitter that transmits transmission data sent via the first transmission link through the second transmission link, a canceller that cancels transmission of the transmission data through the second transmission link upon receiving a canceling command via the first transmission link, and an observer that observes whether the communication via the first transmission link, which transmits the transmission data to the communication device, is enabled, in response to receiving the transmission data via the first transmission link.

17 Claims, 8 Drawing Sheets

COMMUNICATION DEVICE AND COMMUNICATION SYSTEM

CROSS REFERENCE TO RELATED APPLICATION

This application claims priority to Japanese Patent Application No. 2009-178695, filed on Jul. 31, 2009, the entire subject matter and disclosure of which is incorporated herein by reference.

BACKGROUND OF THE DISCLOSURE

1. Field of the Disclosure

The features herein relate to a communication device and a communication system.

2. Description of the Related Art

A known communication system includes a data processing device having a reading function and a communication device having a facsimile transmission function. The communication system works in such a way that the data processing device reads image data and transmits the image data to the communication device as transmission data, and that the communication device transmits the received transmission data to an opposite device through a telephone network by facsimile.

A known facsimile device is provided with a key, e.g., a button, for canceling facsimile transmission in some cases. For example, a user may become aware of an error in a document or an address in some cases after the user inputs an order to start facsimile transmission and the facsimile device starts reading the document put on a document tray.

SUMMARY OF THE DISCLOSURE

An embodiment of the invention comprises a communication device and a communication system which can advantageously prevent transmission of transmission data, which the user requests to be canceled, from being inconveniently carried out.

In an embodiment of the invention, a communication device is configured to form a first transmission link with a data processing device configured to output transmission data. The communication device comprises a first communication controller configured to control a communication with the data processing device via the first transmission link, a second communication controller configured to control a communication via a second transmission link which is different from the first transmission link, a transmitter configured to transmit the transmission data sent via the first transmission link through the second transmission link, a particular canceller configured to cancel the transmission of the transmission data through the second transmission link upon receiving a canceling command sent via the first transmission link, and an observer configured to observe whether the communication via the first transmission link, which transmits the transmission data to the communication device, is enabled, in response to receiving the transmission data via the first transmission link.

In another embodiment of the invention, a communication system comprises a data processing device configured to output transmission data. The data processing device comprises a cancel command outputter configured to output a canceling command. The communication system also comprises a communication device comprising a first communication controller configured to control a communication with the data processing device via a first transmission link, a second communication controller configured to control a communication via a second transmission link which is different from the first transmission link, a transmitter configured to transmit the transmission data sent via the first transmission link through the second transmission link, a particular canceller configured to cancel the transmission of the transmission data through the second transmission link upon receiving the cancelling command outputted from the data processing device, and an observer configured to observe whether the communication via the first transmission link is enabled, in response to receiving the transmission data via the first transmission link.

Other objects, features, and advantages of embodiments of the present invention will be apparent to persons of ordinary skill in the art from the following description of embodiments with reference to the accompanying drawings.

DETAILED DESCRIPTION OF EMBODIMENTS

Figure 1:
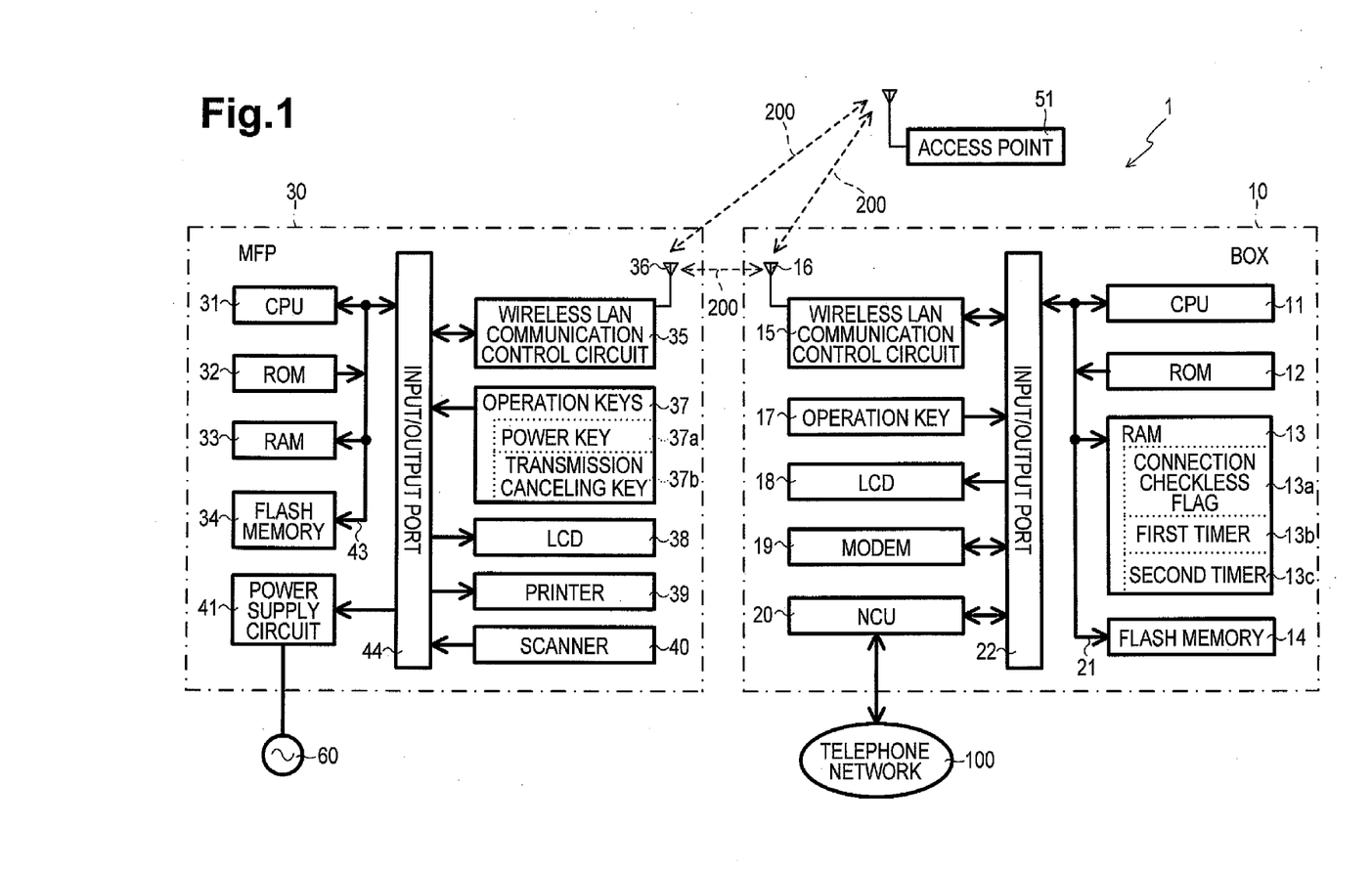
FIG. 1 is a block diagram for illustrating an electric configuration of a communication system including a BOX, an MFP, and an access point, according to an embodiment of the invention.

Various embodiments of the invention, and their features and advantages, will be explained with reference to the FIGS. 1-5B, like numerals being used for corresponding parts in the various drawings. FIG. 1 is a block diagram for illustrating an electric configuration of a communication system 1 including a circuit control device (hereafter interchangeably referred to as the "BOX") 10, a multifunction peripheral device (hereafter interchangeably referred to as the "MFP") 30 and an access point (hereafter interchangeably referred to as the "AP") 51.

The MFP 30 may produce facsimile transmission data with a specified address, and may provide the BOX 10 with the produced data. Meanwhile, upon receiving the facsimile transmission data from the MFP 30, the BOX 10 may transmit the transmission data to the specified address via a telephone network 100. In an embodiment of the invention, the BOX 10 and the MFP 30 are formed separately in the communication system 1, and those devices are connected to each other by wireless or wired. Thus, the MFP 30 may not be connected directly to the telephone network 100 and may thereby be put at any preferred position.

The MFP 30 may be provided with a transmission canceling key 37b for allowing a user to cancel the transmission of the facsimile transmission data. If the user operates the transmission canceling key 37b, the MFP 30 may output a transmission canceling command. Upon receiving the transmission canceling command, the BOX 10 may cancel the transmission of the facsimile transmission data.

If, however, the communication between the BOX 10 and the MFP 30 is disabled, and the MFP 30 outputs a transmission canceling command in the meantime, the BOX 10 does not receive the transmission canceling command. In an embodiment of the invention, even in such a case, the communication system 1 and the BOX 10 of the embodiment may prevent the transmission of the facsimile transmission data to be canceled, as described in detail as follows.

The BOX 10 may include a CPU 11, a ROM 12, a RAM 13, a flash memory 14, a wireless LAN communication control circuit 15, an operation key 17, an LCD 18, a modem 19 and an NCU ("Network Control Unit") 20. The CPU 11, the ROM 12, the RAM 13 and the flash memory 14 may be connected to one another, e.g., via a bus line 21. Further, the wireless LAN communication control circuit 15, the operation key 17, the LCD 18, the modem 19, the NCU 20 and the bus line 21 may be connected to one another via an input/output port 22.

The CPU 11 may control each of the units connected with the input/output port 22 in accordance with a fixed value or a program stored in the ROM 12, etc. or various signals exchanged via a transmission line 200. The ROM 12 may be a non-rewritable memory in which a program for carrying out a process described later, e.g., as described with reference to FIGS. 4A, 4B, 5A, and 5B, etc. is stored.

The RAM 13 may be a rewritable volatile memory, and may include a connection checkless flag 13a, a first timer 13b and a second timer 13c. If the connection checkless flag 13a is "0", the BOX 10 may transmit a connection check command to the MFP 30. If the connection checkless flag 13a is "1", the BOX 10 does not transmit a connection check command to the MFP 30. The connection check command will be described in more detail later, with reference to FIG. 2. The first timer 13b may be a timer which counts a lapse of time since the connection check command is transmitted. The second timer 13c is a timer which may be used for periodic transmission of the connection check command. The flash memory 14 may be a rewritable non-volatile memory.

The wireless LAN communication control circuit 15 may form the transmission lines 200 with the MFP 30 and the AP 51, and may control wireless communication of a wireless LAN system over the transmission lines 200. The wireless LAN system described here is, e.g., a communication system defined by the specifications of IEEE 802.11a/b/g.

The LCD 18 may display a menu, an operation procedure, a state of a process being carried out, information corresponding to a press of the operation key 17, etc. The modem 19 may modulate facsimile transmission data sent from the MFP 30 to a signal which may be transmitted through the telephone network 100, and may transmit the signal via the NCU 20. The modem 19 also may receive and demodulate a signal sent from the telephone network 100 via the NCU 20. The NCU 20 may control communication through the telephone network 100.

The MFP 30 may include a CPU 31, a ROM 32, a RAM 33, a flash memory 34, a wireless LAN communication control circuit 35, operation keys 37, an LCD 38, a printer 39 and a scanner 40.

The CPU 31, the ROM 32, the RAM 33 and the flash memory 34 may be connected to one another, e.g., via a bus line 43. Further, the wireless LAN communication control circuit 35, the operation keys 37, the LCD 38, the printer 39, the scanner 40, a power supply circuit 41 and the bus line 43 may be connected to one another via an input/output port 44.

The CPU 31 may control each of functions and each of the units connected with the input/output port 44 in accordance with a fixed value or a program stored in the ROM 32, etc. or various signals exchanged via the wireless LAN communication control circuit 35.

The ROM 32 may be a non-rewritable memory in which a control program run by the MFP 30, etc. is stored. Respective programs for carrying out a facsimile mode process, which is described in detail later with reference to FIGS. 3A and 3B, may be stored in the ROM 32. The RAM 33 and the flash memory 34 may be a rewritable volatile memory and a rewritable non-volatile memory, respectively. The wireless LAN communication control circuit 35 may be configured similarly as the wireless LAN communication control circuit 15, and its explanation is omitted.

The operation keys 37 include a power key 37a that a user may operate to power on and off the MFP 30, and a transmission canceling key 37b. The CPU 31 may control power supply and a cut-off from the power supply circuit 41 to each of the units in accordance with operations on the power key 37a.

The power supply circuit 41 may be a power supply circuit which converts AC voltage 60 supplied by a commercial power source connected via a power plug (not shown) into DC voltage, and supplies each of the units of the MFP 30 with the DC voltage. A permanent connection line (not shown in FIG. 1) may be positioned between the power supply circuit 41 and the CPU 31 for supplying power from the power supply circuit 41 to the CPU 31 at all times.

A power supply line (not shown) may be positioned between each of the units, except for the CPU 31 and the power supply circuit 41, for supplying power from the power supply circuit 41 to each of the units. A switch (not shown) may be provided between the power supply circuit 41 and the CPU 31 for switching the power-on and off from the power supply circuit 41 to each of the units.

If the user operates the power key 37a in a powered-off state in which each of the units except for the CPU 31 is not supplied with power, the CPU 31 may turn on the switch (not shown), so as to shift the MFP 30 to a powered-on state, in which each of the units is supplied with power by power supply circuit 41. Meanwhile, if the user operates the power key 37a in the powered-on state, the CPU 31 may cut off the power supplied from the power supply circuit 41 to each of the units except for the CPU 31 by turning the switch off, so as to shift the MFP 30 to the powered-off state.

If the transmission canceling key 37b is operated, the MFP 30 outputs a transmission canceling command to the BOX 10. The transmission canceling command will be described later in more detail with reference to FIG. 2.

The LCD 38, the printer 39 and the scanner 40 may include a known LCD, a known printer and a known scanner, and their explanations are omitted. The MFP 30 produces facsimile transmission data on the basis of a document that the scanner 40 reads, and outputs the facsimile transmission data to the transmission line 200.

Figure 2:
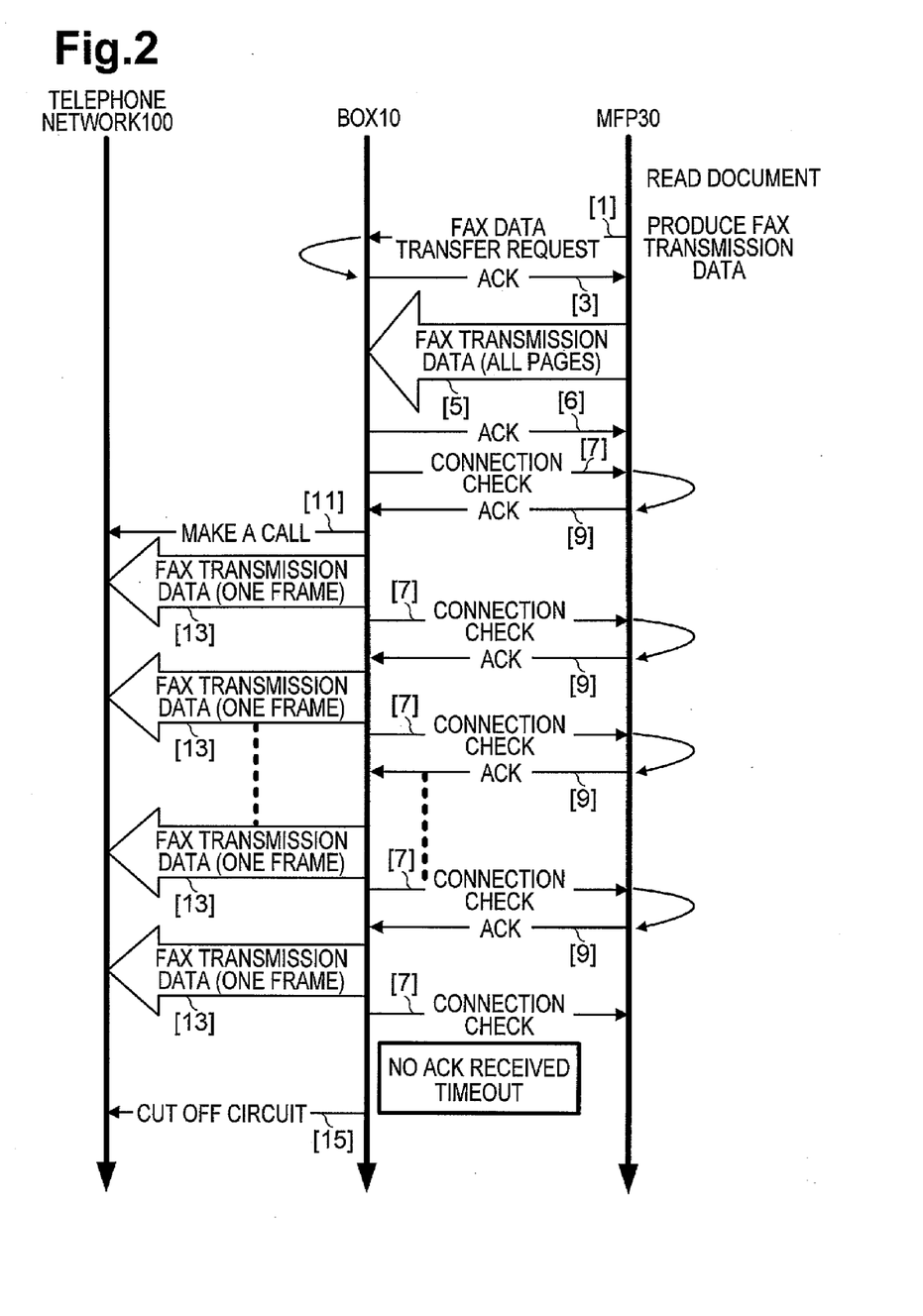
FIG. 2 schematically illustrates an exemplary sequence of a facsimile transmission data transmission process carried out by the BOX, according to an embodiment of the invention.

FIG. 2 schematically illustrates an exemplary sequence of a facsimile transmission data transmission process carried out by the BOX 10, according to an embodiment of the invention. In an embodiment of the invention, among data communication events shown in FIG. 2, every event concerning the communication between the BOX 10 and the MFP 30 may be carried out via the transmission line 200.

To begin with, the MFP 30 may read a document by using the scanner 40, and may produce facsimile transmission data. Further, a facsimile number of an opposite device that a user inputs to the MFP 30 may be specified as an address of the facsimile transmission data.

Then, the MFP 30 may transmit a facsimile data transfer request to the BOX 10 via the transmission line 200 [1]. Upon receiving the facsimile data transfer request, the BOX 10 may transmit an ACK command to the MFP 30 [3].

Then, the MFP 30 may output the facsimile transmission data with the specified address [5]. After receiving the facsimile transmission data, the BOX 10 first may output an ACK command [6] and next may output a connection check command to the MFP 30, i.e., the sender of the facsimile transmission data [7]. If the MFP 30 reads a plurality of pages of the document and transmits the facsimile transmission data of the plural pages to the BOX 10, the BOX 10 may output an ACK command and a connection check command after receiving the facsimile transmission data of all the pages.

Upon receiving the connection check command, the MFP 30 may transmit an ACK command to the BOX 10 [9]. Upon receiving the ACK command from the MFP 30, the BOX 10 may detect a state in which the communication with the MFP 30 is being enabled via the transmission line 200. As described above, the BOX 10 may observe whether the communication with the MFP 30 is being enabled via the transmission line 200, depending upon whether the MFP 30 replies to the connection check command.

Upon receiving the ACK command, the BOX 10 connects, e.g., makes a call, to the address specified for the facsimile transmission data received from the MFP 30 [11], and transmits the facsimile transmission data on a frame-by-frame basis via communication through the telephone network 100 [13].

As described above, after receiving the facsimile transmission data of all the pages, the BOX 10 may start to transmit the facsimile transmission data to the telephone network 100.

Then, after starting to transmit the facsimile transmission data, the BOX 10 may output a connection check command to the MFP 30, i.e., the sender of the facsimile transmission data [7]. Upon receiving the connection check command, the MFP 30 may transmit an ACK command to the BOX 10 [9]. That is, the BOX 10 may observe the wireless communication with the MFP 30 via the transmission line 200 also while transmitting the facsimile transmission data.

If the user operates the transmission canceling key 37b, e.g., as shown in FIG. 1, the MFP 30 may transmit a transmission canceling command to the BOX 10, although this transmission is not shown in FIG. 2. Upon receiving the transmission canceling command, the BOX 10 cancels the transmission of the facsimile transmission data. Thus, upon becoming aware of an error in the address or in the document, the user may cancel the transmission of the facsimile transmission data addressed to an undesirable addressee or the transmission of the facsimile transmission data itself by operating the transmission canceling key 37b of the MFP 30.

When BOX 10 does not receive the transmission canceling command, the BOX 10 may continue to transmit the facsimile transmission data and to observe the wireless communication via the transmission line 200. The first timer 13b may count a lapse of time starting from when BOX 10 transmits the connection check command. When BOX 10 does not receive the ACK command after the first timer 13b reaches a timeout after the connection check command is output while the process is being repeated, the BOX 10 may detects the communication with the MFP 30 via the transmission line 200 as being disabled because no ACK command has been received before first timer 13b reaches the timeout.

In this case, the BOX 10 may transmit a disconnection signal, e.g., a cut-off signal, to the telephone network 100 and may disconnect a connection with an exchange (not shown) of the telephone network 100, so as to cancel the transmission of the facsimile transmission data [15].

Thus, even if the BOX 10 cannot receive the transmission canceling command output from the MFP 30 because the wireless communication with the MFP 30 via the transmission line 200 has been disabled, the BOX 10 may cancel the transmission of the facsimile transmission data via the above process. As a result, the transmission of the facsimile transmission data which should be canceled may be prevented from being inconveniently carried out.

Figure 3A:
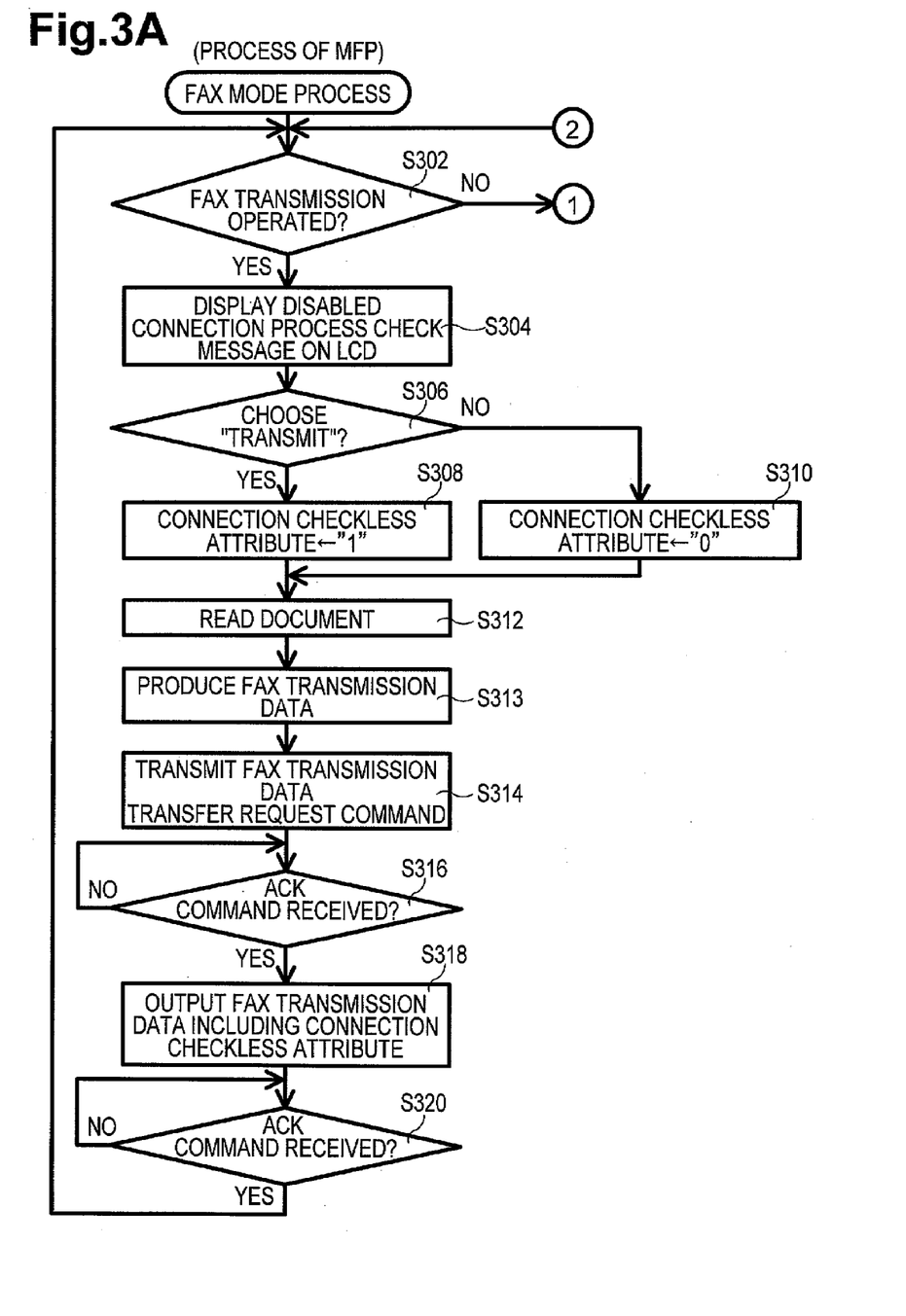
FIGS. 3A and 3B are flowcharts for illustrating a facsimile mode process carried out by a CPU of the MFP, according to an embodiment of the invention.
Figure 3B:
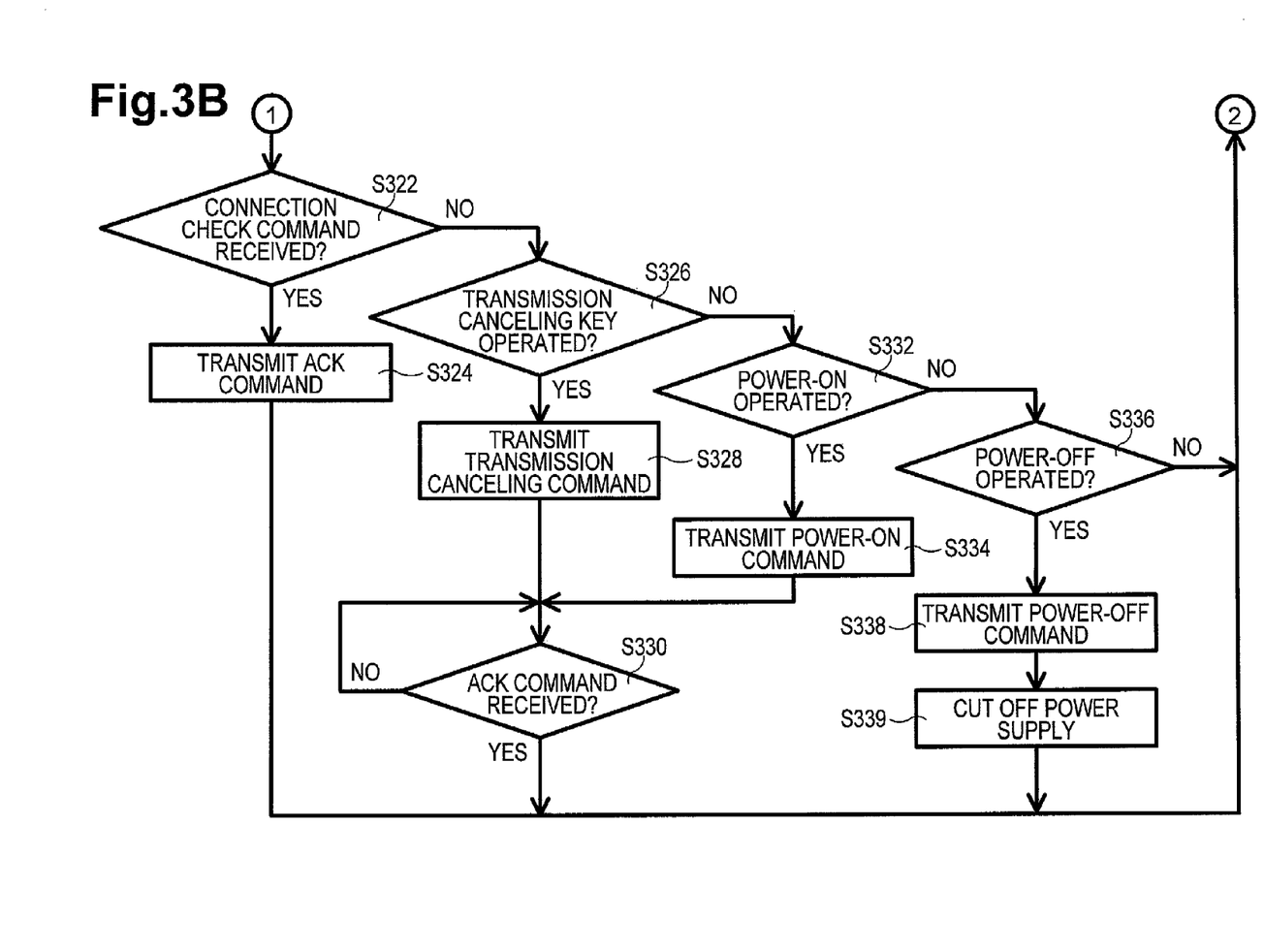

FIGS. 3A and 3B are flowcharts for illustrating a facsimile mode process carried out by the CPU 31 of the MFP 30, according to an embodiment of the invention. The facsimile mode process may be carried out while the MFP 30 is set in the facsimile mode.

To begin with, at Step S302, the CPU 31 may identify whether an operation for facsimile transmission is executed. According to an embodiment, if a user operates a transmission key (not shown) after setting a document at a proper position and inputting a facsimile number of an addressee's opposite device, the CPU 31 may identify an operation for facsimile transmission as having been executed. In another embodiment of the invention, the user may perform a different operation in order to execute an operation for facsimile transmission.

If the identification of Step S302 is affirmative, e.g., "YES" at Step S302, then at Step S304, the CPU 31 may display a disabled connection process check message, e.g., "transmit fax even if MFP and BOX cannot be connected?" on the LCD 38. If the user operates for facsimile transmission after strictly checking the address and the document for an error, the user then may rarely operate the transmission canceling key 37b thereafter. Thus, it may be desirable to transmit the facsimile transmission data even if the wireless communication between the BOX 10 and the MFP 30 becomes disconnected.

Thus, according to an embodiment, the MFP 30 may inquire about the process in case of disabled communication between the MFP 30 and the BOX 10 before the output of the facsimile transmission data.

Then, at Step S306, the CPU 31 may identify whether the user chooses "transmit" in response to the disabled connection process check message displayed on the LCD 38. If the identification of Step S306 is affirmative, e.g., "YES" at Step S306, then at Step S308, the CPU 31 may set a connection checkless attribute, i.e., a command indicating whether there is a need to observe the wireless communication via the transmission line 200, to "1". The connection checkless attribute "1" may be a command which indicates that it is unnecessary to observe the wireless communication via the transmission line 200. Upon receiving the connection checkless attribute "1", the BOX 10 may not observe the wireless communication via the transmission line 200.

Meanwhile, if the identification of S306 is negative, e.g. "NO" at Step S306, then at Step S310, the CPU 31 sets the connection checkless attribute to "0". The connection checkless attribute "0" may be a command which indicates that it is necessary to observe the wireless communication via the transmission line 200. Upon receiving the connection checkless attribute "0", the BOX 10 may observe the wireless communication via the transmission line 200.

Then, at Step S312, the CPU 31 may read all pages of a document set at a proper position by using the scanner 40, and at Step S313, the CPU 31 may produce facsimile transmission data and may store the facsimile transmission data in the RAM 33. Then, at Step S314, the CPU 31 may transmit a facsimile transmission data transfer request command to the BOX 10, and, at Step S316, may wait for an ACK command to be received.

Upon receiving the ACK command, e.g., "YES" at Step S316, the CPU 31 may output the facsimile transmission data including the connection checkless attribute, and at Step S318, the CPU 31 may transmit the facsimile transmission data to the BOX 10 via the transmission line 200. Because the CPU 31 transmits the connection checkless attribute in relation to the facsimile transmission data, the BOX 10 may control every unit of the facsimile transmission data as to whether the wireless communication via the transmission line 200 is observed, which is convenient for the user to use.

Then, at Step S320, the CPU 31 may wait for an ACK command to be received. Upon receiving the ACK command, e.g., "YES" at Step S320, the CPU 31 may return to Step S302.

If the identification of Step S302 is negative, e.g., "NO" at Step S302, then at Step S322, CPU 31 may identify whether the CPU 31 has received a connection check command. Thus, because the BOX 10 transmits a connection check command to the MFP 30 as described above, CPU 31 determines whether the CPU 31 has received a connection check command, so that BOX 10 may observe whether the wireless communication is being enabled via the transmission line 200.

If the identification of Step S322 is affirmative, e.g., "YES" at Step S322, then at Step S324, the MFP 30 may transmit an ACK command to the BOX 10, and then CPU 31 may return to Step S302. The BOX 10 thereby may detect a state in which the communication with the MFP 30 is enabled via the transmission line 200.

Meanwhile, if the identification of Step S322 is negative, e.g., "NO" at Step S322, then at Step S326, the CPU 31 may identify whether the transmission canceling key 37b has been operated. If the identification of Step S326 is affirmative, e.g., "YES" at Step S326, then at Step S328, the CPU 31 may output a transmission canceling command and may transmit the transmission canceling command to the BOX 10. Then, at Step S330, the CPU 31 may wait for an ACK command to be received. Upon receiving the ACK command, e.g., "YES" at Step S330, then the CPU 31 may return to Step S302.

If the identification of Step S326 is negative, e.g., "NO" at Step S326, then at Step S332, the CPU 31 may identify whether an operation to power on the MFP 30 is executed. Specifically, the CPU 31 may identify whether an operation to press the power key 37a while the MFP 30 is in a powered off state, in which only the CPU 31 may be supplied with power. If the identification of Step S332 is affirmative, e.g., "YES" at Step S332, then at Step S334, the CPU 31 may transmit a power-on command to the BOX 10.

The power-on command transmitted to the BOX 10 may indicate that the operation to power on the MFP 30 is executed. Then, at Step S330, the CPU 31 may wait for an ACK command to be received. Meanwhile, if the identification of Step S332 is negative, e.g. "NO" at Step S322, then at Step S336, the CPU 31 may identify whether an operation to power off the MFP 30 is executed. Specifically, the CPU 31 may identify whether an operation to press the power key 37a while the MFP 30 is in a powered on state has been executed. If the identification of Step S336 is negative, e.g., "NO" at Step S336, then the CPU 31 returns to Step S302 and repeats the process.

Meanwhile, if the identification of Step S336 is affirmative, e.g., "YES" at Step S336, then at Step S338, the CPU 31 may transmit a power-off command to the BOX 10. The power-off command transmitted to the BOX 10 may indicate that the operation to power off the MFP 30 is executed. Then, at Step S339, the CPU 31 may cut off the power supply from the power supply circuit 41 to each of the units, except for the CPU 31. Thus, the MFP 30 thereby may be set in the powered off state, in which only the CPU 31 is supplied with power, and the CPU 31 may return to Step S302.

Upon receiving the power-off command from the MFP 30, the BOX 10 may set the connection checkless flag 13a to "1". Then, if the connection checkless flag 13a is "1", the BOX 10 may not observe the wireless communication via the transmission line 200. That is, if the power key 37a of the MFP 30 is operated so that the MFP 30 is powered off, the BOX 10 may interrupt the observation of the wireless communication. Even if the wireless communication via the transmission line 200 is disconnected, the BOX 10 may not cancel the transmission of the facsimile transmission data.

If the MFP 30 is forcibly powered off, e.g., because a power plug is pulled from an outlet, or because of loss of power to the outlet, but not because the power key 37a is operated, then neither the power supply circuit 41 nor the CPU 31, e.g., as shown in FIG. 2, is supplied with power. The MFP 30 thereby may finish the facsimile mode process without issuing a power-off command. As a result, the BOX 10 may continue to observe the wireless communication via the transmission line 200, and may cancel the transmission of the facsimile transmission data if the wireless communication is disconnected.

FIGS. 4A, 4B, 5A and 5B are flowcharts for illustrating the facsimile transmission data transmission process carried out by the CPU 11 of the BOX 10, according to an embodiment of the invention. The facsimile transmission data transmission process may be carried out at regular intervals while the BOX 10 is being powered on. The BOX 10 transmits facsimile transmission data sent from the MFP 30 to a specified address via the telephone network 100. Even while carrying out the facsimile transmission data transmission process, the CPU 11 may set the connection checkless flag 13a to "1" and "0" by carrying out an interrupt process upon receiving a power-on command and a power-off command from the MFP 30, respectively (not shown).

Figure 4A:
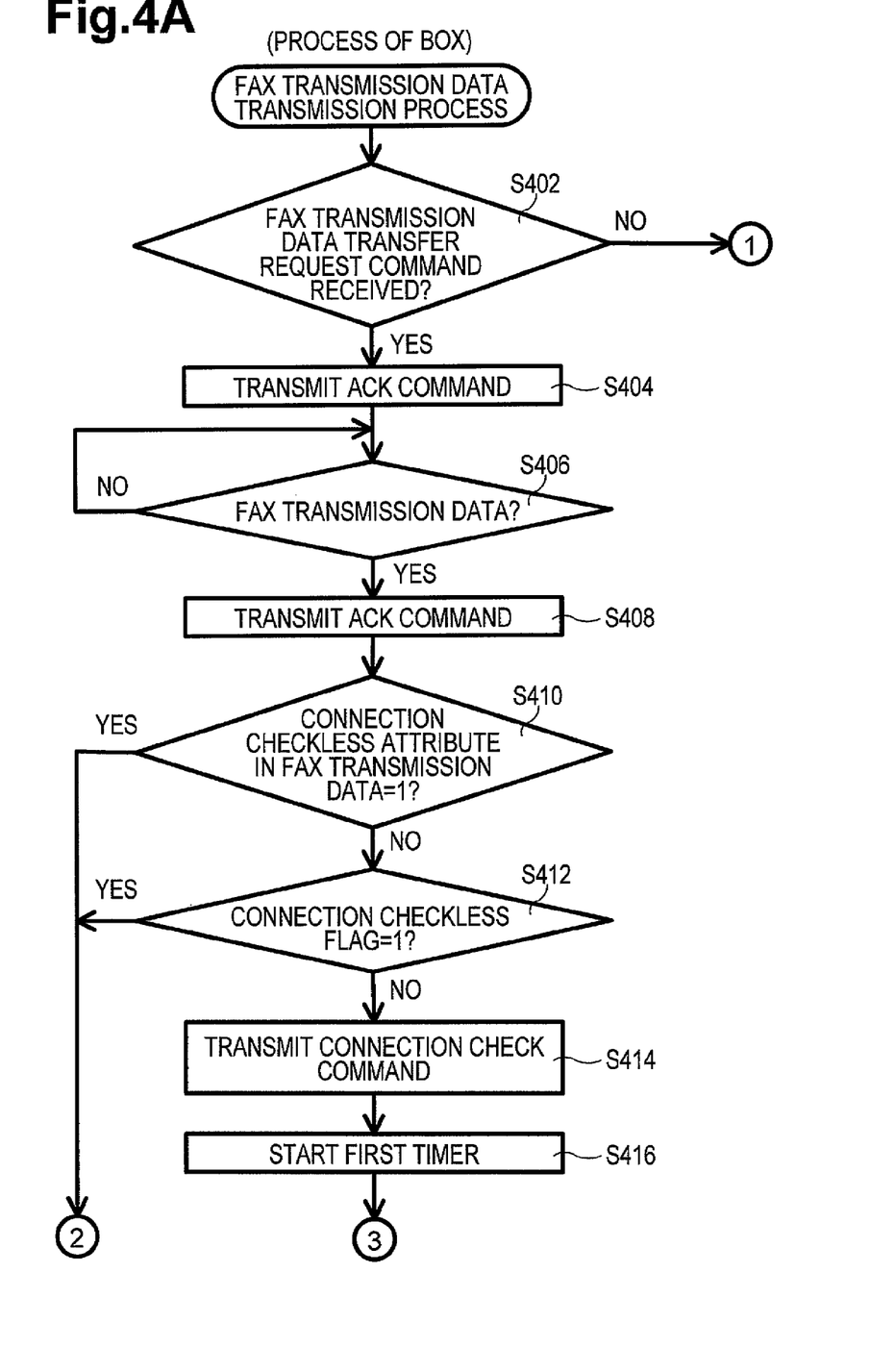
FIGS. 4A and 4B are flowcharts for illustrating the facsimile transmission data transmission process carried out by a CPU of the BOX, according to an embodiment of the invention.

To begin with, at Step S402, the CPU 11 may identify whether a facsimile transmission data transfer request command is received from the MFP 30. If the identification of Step S402 is negative, e.g., "NO" at Step S402, then, the CPU 11 ends the process.

Meanwhile, if the identification of Step S402 is affirmative, e.g., "YES" at Step S402, then at Step S404, the CPU 11 may transmit an ACK command to the sender of the facsimile transmission data transfer request command. Then, at Step S406, the CPU 11 may suspend the process until facsimile transmission data is sent from the sender of the facsimile transmission data transfer request command. If the facsimile transmission data is provided, the identification of Step S406 turns affirmative, e.g. "YES" at Step S406. Then, at Step S408, the CPU 11 may transmit an ACK command to the MFP 30, i.e., the sender of the facsimile transmission data.

Then, at Step S410, the CPU 11 may identify whether the connection checkless attribute included in the facsimile transmission data received at Step S406 is "1". If the connection checkless attribute included in the facsimile transmission data received at Step S406 is "1", e.g. "YES" at Step S410, then the CPU 11 skips Steps S412-S425 for observing the wireless communication via the transmission line 200, and shifts to Step S426. That is, if the connection checkless attribute provided in relation to the facsimile transmission data is "1" indicating that the communication need not to be observed, the CPU 11 may not observe the communication for identifying whether the transmission of the facsimile transmission data needs to be canceled.

If the user does not intend to cancel the transmission of the facsimile transmission data, no connection checkless command for observing the communication may be transmitted and no ACK command is received, and communication traffic on the transmission line 200 can thereby be reduced. Further, even if the communication between the BOX 10 and the MFP 30 is disabled, the facsimile transmission data may be transmitted to the addressee.

Meanwhile, if the connection checkless attribute is "0", i.e., the connection checkless attribute indicates that the wireless communication via the transmission line 200 needs to be observed, the identification of Step S410 may turn negative, e.g., "NO" at Step S410. In this case, at Step S412, the CPU 11 may identify whether the connection checkless flag 13a is "1".

The process will be explained first in an assumption that the connection checkless flag is not "1". Specifically, when the identification of Step S412 is negative in this case, e.g. "NO" at Step S412, then at Step S414, the CPU 11 then may transmit a connection check command to the MFP 30, i.e., the sender of the facsimile transmission data. Then, at Step S416, the CPU 11 may start the first timer 13b, and at Step S418, may identify whether an ACK command is received. That is, the CPU 11 observes whether the wireless communication is enabled via the transmission line 200.

Figure 4B:
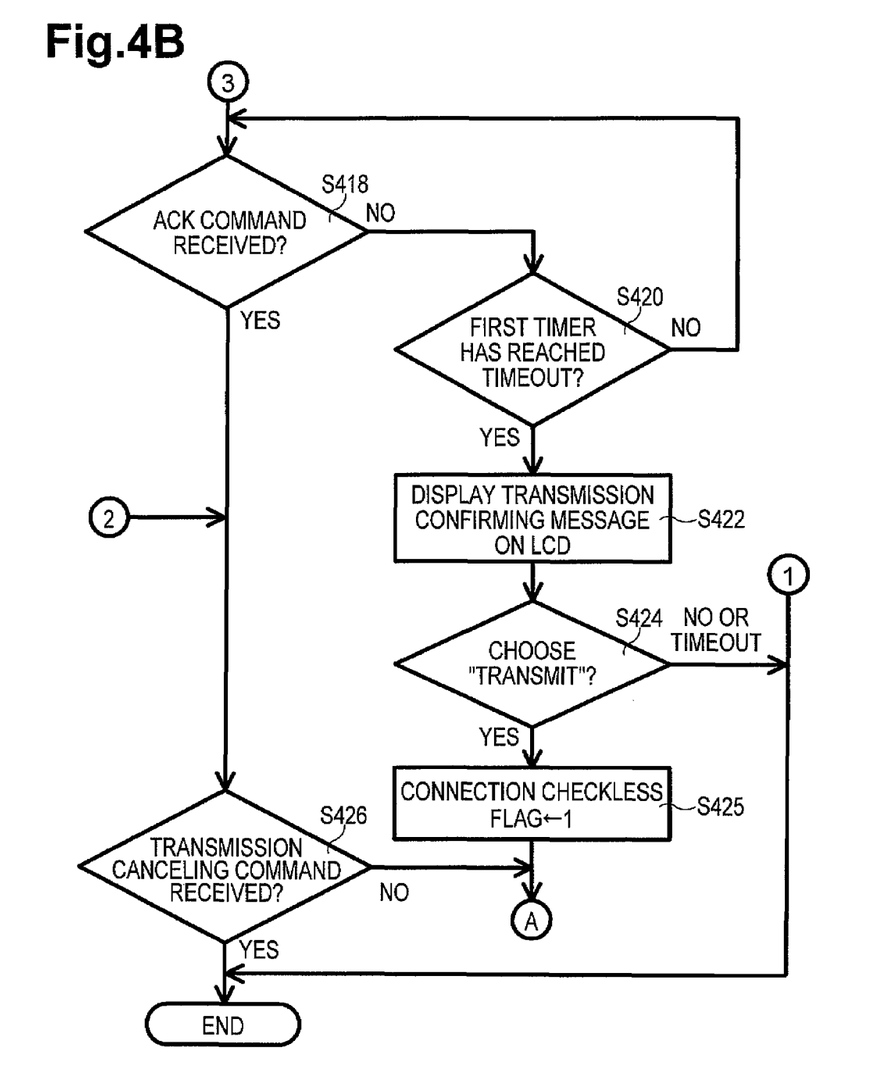

If the identification of Step S418 is negative, e.g. "NO" at Step S418, then at Step S420, the CPU 11 may identify whether the first timer 13b has reached a timeout. While the identification of S420 is negative, e.g. "NO" at Step S420, the CPU 11 may return to Step S418. Upon receiving an ACK command, e.g., "YES" at Step S418 while repeating the process in such a way, then at Step S426, the CPU 11 then may identify whether the CPU 11 has received a transmission canceling command transmitted from the MFP 30, i.e., the sender of the facsimile transmission data, via the transmission line 200.

If the identification of Step S426 is affirmative, e.g. "YES" at Step S426, then the CPU 11 may end the facsimile transmission data transmission process. That is, upon receiving the transmission canceling command output from the MFP 30 via the transmission line 200, the CPU 11 may cancel the transmission of the facsimile transmission data. If the identification of Step S426 is negative, e.g., "NO" at Step S426, then the CPU 11 may shift to Step S427 shown in FIG. 5A and may start to transmit the facsimile transmission data.

Meanwhile, upon receiving no ACK command, e.g. "NO" at Step S418, and identifying the first timer 13b as having reached a timeout, e.g., "YES" at Step S420, then the CPU 11 may detect that the wireless communication with the MFP 30 via the transmission line 200 is disabled on the basis that the CPU 11 has not received an ACK command in a given period of time. If that is the case, then at Step S422, the CPU 11 may display on the LCD 18 a transmission confirming message such as "Communication with MFP is disabled. Do you start facsimile transmission?".

Then, at Step S424, the CPU 11 may identify whether the user has chosen "transmit" in response to the transmission confirming message displayed on the LCD 18. Specifically, the CPU 11 may identify whether the user has chosen to transmit the facsimile transmission data by operating the operation key 17 provided to the BOX 10, regardless of the communication between the BOX 10 and the MFP 30 being disabled.

If the identification of Step S424 is negative, or "transmit" was not chosen in a given period of time, e.g. "NO" at Step S424, or a timeout with no selection, then the CPU 11 ends the facsimile transmission data transmission process. The transmission of the facsimile transmission data thereby may be canceled.

Figure 5A:
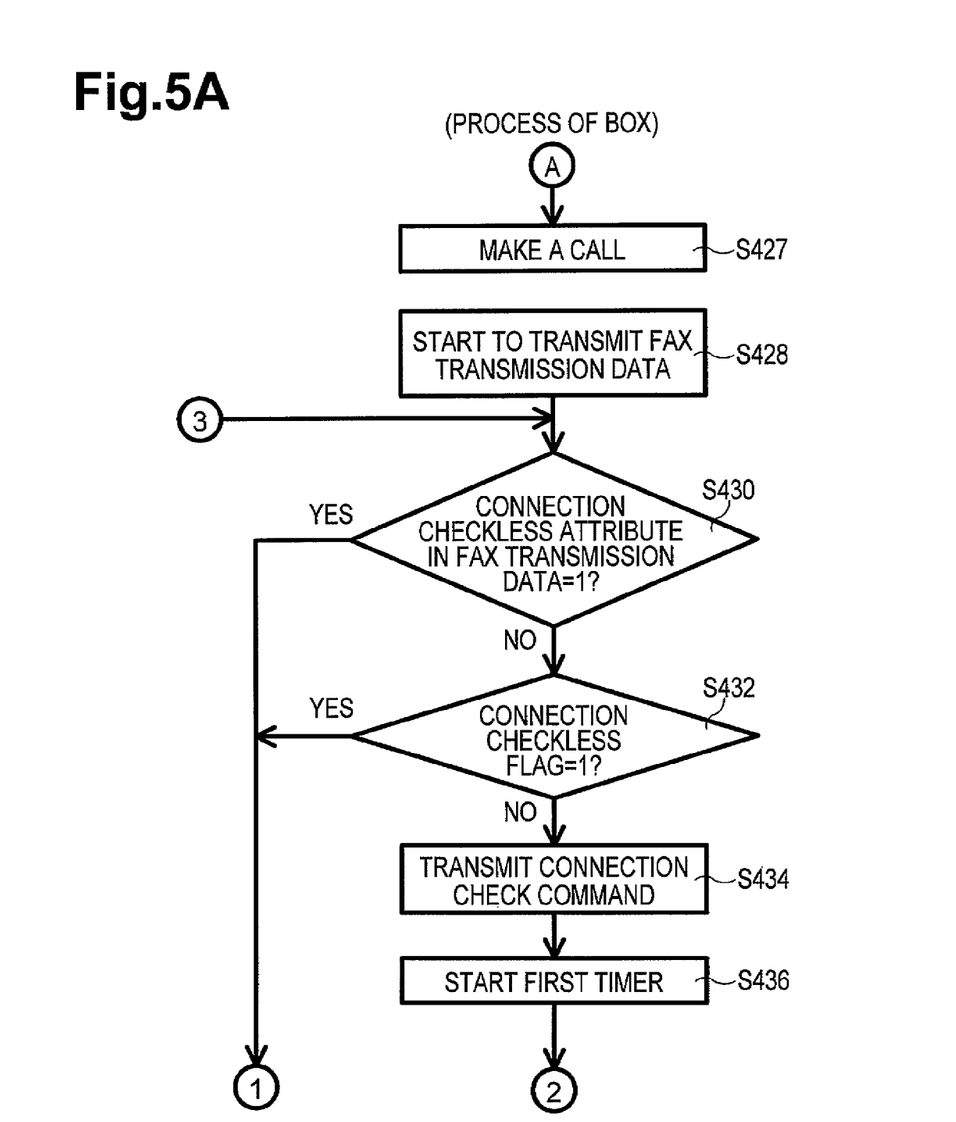
FIGS. 5A and 5B are flowcharts for illustrating a continuation of the facsimile transmission data transmission process shown in FIG. 4B.

Meanwhile, if the identification of Step S424 is affirmative, e.g. "YES" at Step S424, then at Step S425, the CPU 11 may set the connection checkless flag 13a to "1", and then may shift to Step S427, shown in FIG. 5A. When the connection checkless flag 13a is set to "1", the BOX 10 may not observe the wireless communication via the transmission line 200 while transmitting the facsimile transmission data in the following process.

Upon receiving a power-on command from the MFP 30, the BOX 10 may set the connection checkless flag 13a to "0". Similarly, upon receiving a power-off command sent from the MFP 30, as described above, the BOX 10 may set the connection checkless flag 13a to "1". If "transmit" is chosen at Step S425, the BOX 10 also may set the connection checkless flag 13a to "1".

If the connection checkless flag 13a is set to "1", the identification of Step S412 may turn affirmative, and the CPU 11 thereby may skip Steps S414-S425, so as to stop observing the wireless communication with the MFP 30 via the transmission line 200.

That is, if the MFP 30 sends the power-off command to the BOX 10, the BOX 10 may not cancel the transmission of the facsimile transmission data, even regardless of the wireless communication with the MFP 30 being disabled, because the MFP 30 does not output a transmission canceling command while the MFP 30 is being powered off. In other words, the BOX 10 may cancel the transmission of the facsimile transmission data if the BOX 10 cannot receive a transmission canceling command although the MFP 30 is powered on because the wireless communication with the MFP 30 via the transmission line 200 is disabled.

When operating the MFP 30 according to an embodiment of the invention, a user may disconnect the power plug from the outlet to power off the MFP 30 in some cases. In particular, a user may become aware of an error in the address or the document and may want to cancel the transmission of the facsimile transmission data after the scanner 40 of the MFP 30 finishes reading the document, and the user could be confused in some cases. Such a user could suddenly disconnect the power plug from the outlet, if the user forgets about or is unaware of the transmission canceling key 37b provided to the MFP 30.

In such a case, the power supplied to the CPU 31 of the MFP 30 is cut off, and the MFP 30 may be powered off without outputting a power-off command. As a result, the BOX 10 of the embodiment may not receive a power-off command from the MFP 30. Thus, the BOX 10 may keep the connection checkless flag 13a at "0" and may continue to observe the wireless communication with the MFP 30 via the transmission line 200. Thus, because the wireless communication with the MFP 30 is disabled, the BOX 10 may cancel the transmission of the facsimile transmission data.

Further, if a power-on command is sent from the MFP 30 while the transmission line 200 is not being observed as the connection checkless flag 13a is "1", the BOX 10 may set the connection checkless flag 13a to "0". The identification of Step S412 thereby turns negative, e.g., "NO" at Step S412. Thus, after that, the BOX 10 may again start to observe the wireless communication via the transmission line 200. Thus, if the MFP 30 is powered off once and an operation to power on the MFP 30 again is executed, the MFP 30 may possibly provide the BOX 10 with a transmission canceling command afterward the MFP is powered on again. That may occur in a case where, e.g., the user powers off the MFP 30 after finishing a process for outputting facsimile transmission data, and then becomes aware of an error in the address or the document, powers on the MFP 30 while being confused and operates the MFP 30 to cancel the transmission of the facsimile transmission data. Even in such a case, the transmission of the facsimile transmission data may be certainly canceled according to the facsimile transmission data transmission process of an embodiment of the invention.

The BOX 10 may observe the wireless communication with the MFP 30 via the transmission line 200, as previously explained. Upon detecting the communication between the BOX 10 and the MFP 30 becoming disabled, the BOX 10 may cancel the transmission of the facsimile transmission data, thereby preventing the facsimile transmission data from being transmitted. This may reduce a processing load of the data communication through the telephone network 100.

Further, if the BOX 10 is set not to immediately transmit facsimile transmission data received from the MFP 30, e.g., to transmit the transmission data at a specified date and time as reserved transmission, the communication with the MFP 30 possibly may be disabled while waiting to transmit the facsimile transmission data in some cases. If a transmission canceling command is sent from the MFP 30 while the communication with the MFP 30 is disabled, the BOX 10 may not receive the transmission canceling command. The BOX 10 according to an embodiment, however, may cancel the transmission of the facsimile transmission data even in a case described above where the BOX 10 waits to transmit the facsimile transmission data for a period of time after receiving the facsimile transmission data.

Figure 5B:
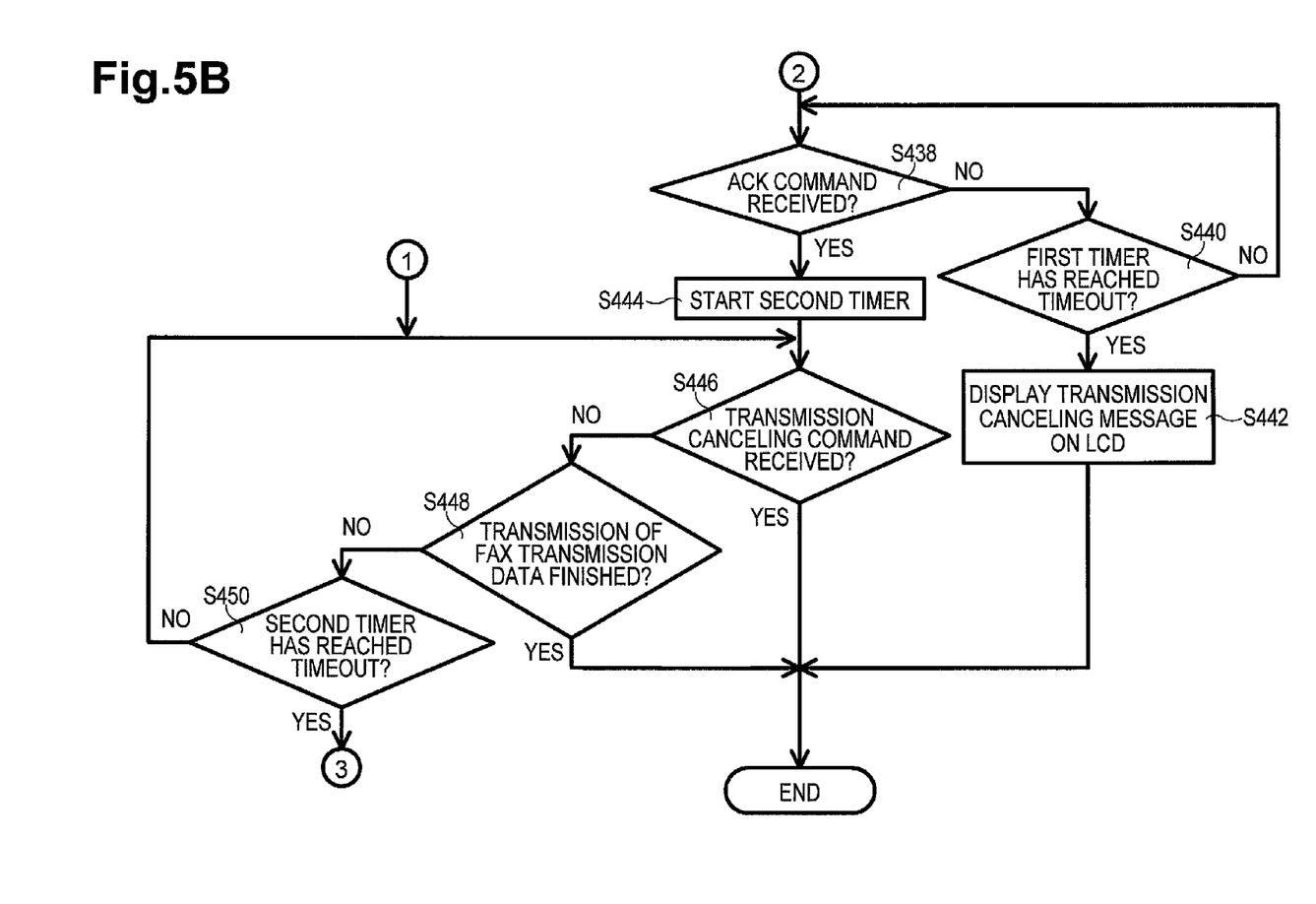

FIGS. 5A and 5B are flowcharts for illustrating a continuation of the facsimile transmission data transmission process shown in FIG. 4B. At Step S427, the CPU 11 may make a call to a specified address of the facsimile transmission data, so as, at Step S428, to start to transmit the facsimile transmission data. After that, the CPU 11 may transmit the facsimile transmission data on a frame-by-frame basis until finishing the facsimile transmission data transmission process.

The BOX 10 may continue to observe the wireless communication via the transmission line 200 after starting to transmit the facsimile transmission data. Specifically, after Step S428, starting to transmit the facsimile transmission data, then at Step S430, the CPU 11 identifies whether the connection checkless attribute included in the facsimile transmission data received at Step S406 is "1". If the identification of Step S430 is affirmative, e.g. "YES" at Step S430, then the CPU 11 skips Steps S432-S444. That is, the BOX 10 may not observe the communication for identifying whether the transmission of the facsimile transmission data needs to be canceled.

Meanwhile, if the identification of Step S430 is negative, e.g., "NO" at Step S430, then at Step S432, the CPU 11 may identify whether the connection checkless flag 13b is "1". If the identification of Step S432 is negative, e.g., "NO" at Step S432, then at Step S434, the CPU 11 may transmit a connection check command to the MFP 30, i.e., the sender of the facsimile transmission data. Then, at Step S436, the CPU 11 may start the first timer 13b, and may, at Step S438, identify whether an ACK command is received. That is, the BOX 10 observes the wireless communication with the MFP 30 via the transmission line 200.

If the identification of Step S438 is negative, e.g., "NO" at Step S438, then at Step S440, the CPU 11 may identify whether the first timer 13b has reached a timeout. While the identification of Step S438 is being negative, e.g., "NO" at Step S440, the CPU 11 may return to Step S438. Upon receiving an ACK command, e.g., "YES" at Step S438, while repeating the process in such a way, then at Step S444, the CPU 11 may start the second timer 13c, and may, at Step S446, identify whether a transmission canceling command is received.

If the identification of Step S446 is affirmative, e.g., "YES" at Step S446, then the CPU 11 may end the facsimile transmission data transmission process and may cancel the transmission of the facsimile transmission data. Meanwhile, if the identification of Step S446 is negative, e.g., "NO" at Step S446, then at Step S448, the CPU 11 then may identify whether the CPU 11 has finished the transmission of the facsimile transmission data. If the identification of Step S448 is affirmative, e.g., "YES" at Step S448, then the CPU 11 ends the process.

Meanwhile, if the identification of Step S448 is negative, e.g., "NO" at Step S448, then at Step S450, the CPU 11 may identify whether the second timer 13c has reached a timeout. While the identification of Step S450 is being negative, e.g., "NO" at Step S450, the CPU 11 may return to Step S446. If the identification of S450 turns affirmative, e.g. "YES" at Step S450 while the process is being repeated, then the CPU 11 returns to Step S430.

If, e.g., the MFP 30 outputs a power-off command and the connection checkless flag 13a is set to "1" while the process is being repeated in such a way, the identification of Step S432 turns affirmative, e.g., "YES" at Step S432, and the CPU 11 may skip Steps S434-S444 and may stop the observation of the wireless communication via the transmission line 200. If, e.g., the MFP 30 outputs a power-on command and the connection checkless flag 13a is set to "0" while the process is being repeated, the identification of Step S432 turns negative, e.g. "NO" at Step S432, and the CPU 11 may restart the observation of the wireless communication that was stopped.

Upon identifying a timeout of the first timer 13b, e.g. "YES" at Step S440 while the process is being repeated, the CPU 11 may detect the wireless communication with the MFP 30 via the transmission line 200 being disabled on the basis that the CPU 11 does not receive an ACK command in a given period of time. If that is the case, then at Step S442, CPU 11 may display on the LCD 18 a transmission canceling message such as "Facsimile transmission is canceled as communication with MFP is disabled". Then, the CPU 11 may end the facsimile transmission data transmission process. The transmission of the facsimile transmission data thereby may be canceled.

In the embodiment described above, the communication device, e.g., BOX 10 and the data processing device, e.g., MFP 30, may be connected by wireless. Nevertheless, in another embodiment of the invention, the communication device and the data processing device may have a wired connection, and the communication between those devices may be disabled by, e.g., the snapping of the wire.

In another embodiment of the invention, transmission line 200 may be a different transmission line than as described above. For example, in an embodiment of the invention, the transmission data may be an email, and the communication device may be a mail server, and the embodiment functions substantially as described above.

In another embodiment of the invention, the communication device may be configured to retry transmitting a command to the data processing device if the data processing device does not reply to a previously transmitted command, and may detect that the communication with the MFP 30 via the transmission line 200 is disabled if the data processing device does not reply several times consecutively.

Further, the above-described embodiments describe one MFP 30 connected to the BOX 10. Nevertheless, in another embodiment of the invention, a plurality of MFPs 30 may be connected to the BOX 10. In this embodiment, the BOX 10 may determine whether the wireless communication via the transmission line 200 should be observed, for each of the MFPs 30. Specifically, if a power-off commend is transmitted from one of the MFPs 30 which is a sender of certain transmission data, BOX 10 may stop the observation of the communication with that MFP 30, and may continue the observation of the communication with another one of the MFPs 30, which is the sender of other transmission data.

Similarly, if a power-on command is transmitted from one of the MFPs 30 which is the sender of certain transmission data, BOX 10 may again start the observation of the communication with that MFP 30, and the observation of the communication with another one of the MFPs 30 for which the BOX 10 has stopped observation of the communication does not again start.

While the invention has been described connection with various exemplary structures and illustrative embodiments, it will be understood by those skilled in the art that other variations and modifications of the structures and embodiments describes above may be made without departing from the scope of the invention. Other structures and embodiments will be apparent to those skilled in the art from a construction of the specification or practice of the invention disclosed herein. It is intended that the specification and described examples are illustrative with the true scope of the invention being defined by the following claims.

What is claimed is:

1. A communication device configured to form a first transmission link with a data processing device configured to output transmission data, comprising:
    a first communication controller configured to control a communication with the data processing device via the first transmission link;
    a receiver configured to receive the transmission data from the data processing device via the first transmission link;
    a storage device configured to store the transmission data received by the receiver;
    a second communication controller configured to control a communication via a second transmission link which is different from the first transmission link;
    a transmitter configured to transmit the transmission data sent via the first transmission link and stored in the storage device through the second transmission link;
    a particular canceller configured to cancel the transmission of the transmission data through the second transmission link upon receiving a canceling command sent via the first transmission link;
    an observer configured to observe whether the communication via the first transmission link, which transmits the transmission data to the communication device, is enabled, in response to receiving the transmission data via the first transmission link and storing the received transmission data in the storage device; and
    a further canceller configured to cancel the transmission of the transmission data stored in the storage device through the second transmission link, after the receiving of the transmission data from the data processing device via the first transmission link and the storing of the received transmission data in the storage device, when the observer observes that the communication with the data processing device is disabled.

2. The communication device according to claim 1, further comprising: a preventer configured to prevent the further canceller from canceling the transmission of the transmission data through the second transmission link, despite detection by the observer that the communication with the data processing device is disabled, upon receiving a power-off command indicating that the data processing device has been operated to be powered off.

3. The communication device according to claim 1, further comprising: a preventer configured to prevent the further canceller from canceling the transmission of the transmission data through the second transmission link, despite detection by the observer that the communication with the data processing device is disabled, upon receiving a power-off command sent from the data processing device.

4. The communication device according to claim 1, further comprising: a third canceller configured to prevent the observer from observing whether the communication via the first transmission link is enabled, upon receiving a power-off command indicating that the data processing device has been operated to be powered off.

5. The communication device according to claim 1, further comprising: a third canceller configured to prevent the observer from observing whether the communication via the first transmission link is enabled, upon receiving a power-off command sent from the data processing device.

6. The communication device according to claim 4, further comprising: an observation reopener configured to again start the observer observing whether the communication via the first transmission link is enabled, upon receiving a power-on command indicating that the data processing device has been operated to be powered on after the third canceller previously prevented the observer from observing.

7. The communication device according to claim 5, further comprising: an observation reopener configured to again start the observer observing whether the communication via the first transmission link is enabled, upon receiving a power-on command sent from the data processing device after the third canceller previously prevented the observer from observing.

8. The communication device according to claim 1, further comprising:
    a receiver configured to receive an observer status command outputted from the data processing device, and related to the transmission data, wherein the observer status command indicates whether the observation of the communication via the first transmission link is requested; and
    the observer is configured to disable observation of whether the communication via the first transmission link is enabled, when the received observer status command indicates that the observation is not requested.

9. The communication device according to claim 1, wherein: the observer is configured to observe the communication via the first transmission link after receiving the transmission data via the first transmission link until the transmitter starts to transmit the transmission data.

10. The communication device according to claim 1, wherein: the observer is configured to observe the communication via the first transmission link after the transmitter starts to transmit the transmission data until the transmitter finishes transmitting the transmission data.

11. A communication system comprising:
    a data processing device configured to output transmission data, the data processing device comprising: a cancel command outputter configured to output a canceling command; and
    a communication device comprising:

a first communication controller configured to control a communication with the data processing device via a first transmission link;

a receiver configured to receive the transmission data from the data processing device via the first transmission link;

a storage device configured to store the transmission data received by the receiver;

a second communication controller configured to control a communication via a second transmission link which is different from the first transmission link;

a transmitter configured to transmit the transmission data sent via the first transmission link and stored in the storage device through the second transmission link;

a particular canceller configured to cancel the transmission of the transmission data through the second transmission link upon receiving the cancelling command outputted from the data processing device;

an observer configured to observe whether the communication via the first transmission link is enabled, in response to receiving the transmission data via the first transmission link and storing the received transmission data in the storage device; and a further canceller configured to cancel the transmission of the transmission data stored in the storage device through the second transmission link, after the receiving of the transmission data from the data processing device via the first transmission link and the storing of the received transmission data in the storage device, when the observer observes that the communication with the data processing device is disabled.

12. The communication system according to claim 11, wherein the data processing device further comprises: a power operator configured to power off the data processing device upon operation of the power operator while the data processing device is powered on, and wherein the communication device further comprises: a preventer configured to prevent the further canceller from canceling the transmission of the transmission data through the second transmission link, despite detection by the observer that the communication with the data processing device is disabled, upon receiving a power-off command indicating that the power operator has powered off the data processing device.

13. The communication system according to claim 12, wherein the data processing device further comprises: a sender configured to send the power-off command from the data processing device to the communication device when the power operator powers off the data processing device.

14. The communication system according to claim 11, wherein the data processing device further comprises: a power operator configured to power off the data processing device upon operation of the power operator while the data processing device is powered on, and wherein the communication device further comprises: a third canceller configured to prevent the observer from observing whether the communication via the first transmission link is enabled upon receiving a power-off command indicating that the power operator has powered off the data processing device.

15. The communication system according to claim 13, wherein the power operator is configured to power on the data processing device upon operation of the power operator while the data processing device is powered off, and wherein the communication device further comprises: an observation reopener configured to again start the observer observing whether the communication via the first transmission link is enabled, upon receiving a power-on command indicating that the power operator has powered on the data processing device, after the third canceller previously prevented the observer from observing.

16. The communication system according to claim 11, wherein the data processing device further comprises: an observer status sender configured to transmit an observer status command related to the transmission data, wherein the observer status command indicates whether the observation of the communication via the first transmission link is requested, and wherein the communication device further comprises: a receiver configured to receive the observer status command, wherein the observer of the communication device is configured to disable observation of whether the communication via the first transmission link is enabled, when the observer status command received by the receiver indicates that the observation is not required.

17. The communication system according to claim 11, wherein the observer is configured to observe the communication via the first transmission link after receiving the transmission data via the first transmission link until the transmitter finishes transmitting the transmission data.

* * * * *